April 28, 1964 F. B. MEYER 3,131,001
PORCH TRAILER
Filed Nov. 5, 1962

INVENTOR.
FRANCIS BURNS MEYER
BY
ATTORNEY

United States Patent Office 3,131,001
Patented Apr. 28, 1964

3,131,001
PORCH TRAILER
Francis Burns Meyer, P.O. Box 66, Summerville, S.C.
Filed Nov. 5, 1962, Ser. No. 235,473
1 Claim. (Cl. 296—27)

This invention relates to trailers adapted to be pulled behind automobiles and more especially to a trailer equipped to be converted into a porch for use with a house trailer.

No porch trailer of any type has heretofore been provided insofar as is presently known. The trailer of the present invention is adapted to be pulled behind an automobile and easily converted into a porch for use on the larger house trailer. It is common practice for house trailers to be towed from one location to another by moving equipment especially designed for that purpose. The trailer of the present invention would be towed behind the automobile of the house trailer owner for assembly into a structure to be fastened to the house trailer for providing a porch therefor. In addition to its use as a porch for a house trailer, trailers constructed in accordance with the present invention may be used to carry equipment which may not be readily carried within the house trailer such as fuel containers, children's toys, etc. The porch trailer may be easily disassembled and stacked on one end of the trailer bed to facilitate the hauling of other such articles.

Accordingly, it is an important object of this invention to provide a trailer which may be readily assembled and disassembled for use as a porch for a house trailer and for hauling additional articles.

Another object of the invention is to provide a porch for a house trailer which may be readily towed behind the automobile of the owner for subsequent attachment to a house trailer.

The construction designed to carry out the invention will be hereinafter described, together with other features thereof.

The invention will be more readily understood from a reading of the following specification and by reference to the accompanying drawing forming a part thereof, wherein an example of the invention is shown and wherein.

Figure 1:
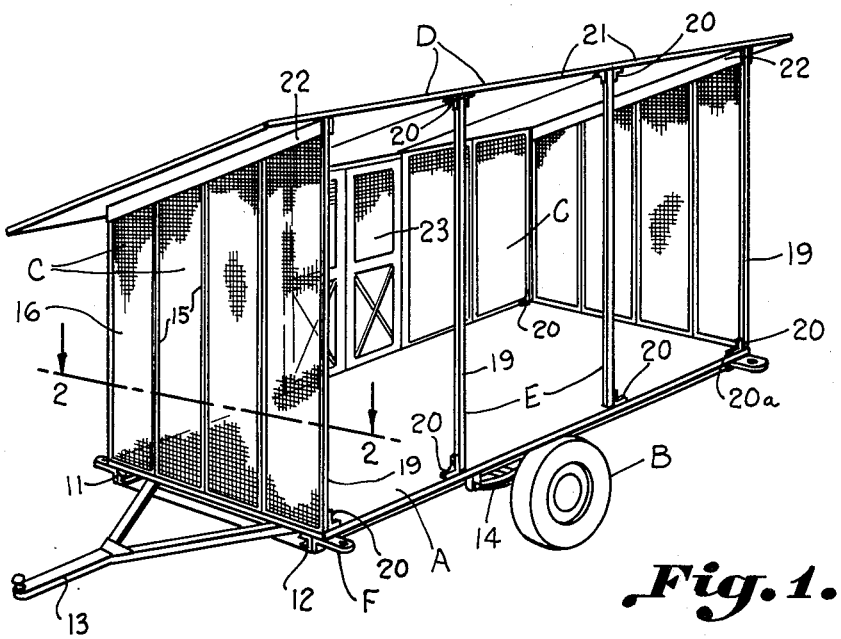
FIGURE 1 is a perspective view illustrating a house trailer constructed in accordance with the present invention.
Figure 2:
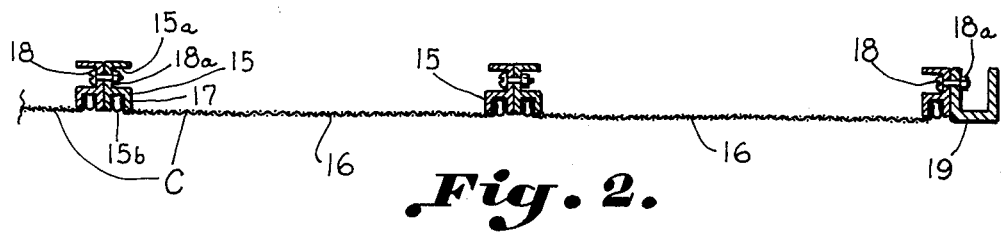
FIGURE 2 is an enlarged sectional plan view taken on the line 2—2 in FIGURE 1.
Figure 3:
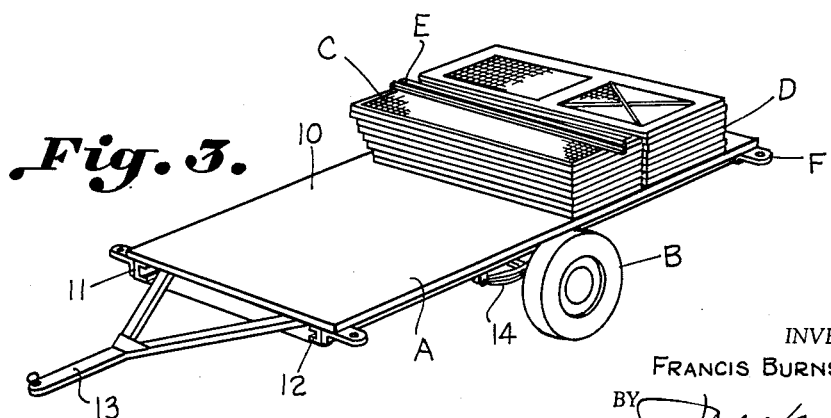
FIGURE 3 is a perspective view of the house trailer with the parts disassembled and stacked for hauling.

The drawing illustrates a porch trailer for use with a house trailer constructed in accordance with the present invention. An elongated substantially rectangular platform A is carried by wheels B positioned in an intermediate portion of the platform. A plurality of side panels C are removably positioned to form upright walls on three sides of the platform. A roof panel D is removably positioned upon the top of said side panels. Vertical supports E define an open side on one side of the trailer. Means F are provided for fastening the porch trailer to the house trailer so that the open side is attached to the house trailer to open into the house trailer.

The elongated substantially rectangular platform A may be constructed of any suitable material such as a sheet 10, preferably of marine plywood, which is carried by a frame, preferably constructed of a pair of parallel longitudinal channel members 11 and 12, provided with suitable cross-bracing (not shown). A trailer hitch 13 is secured to the platform A at one end thereof for attachment to an automobile. The trailer A is supported in an intermediate portion thereof by wheel means B which are supported by a suitable suspension system 14.

A plurality of side panels C are preferably in the form of suitable framing members 15 at the marginal portions with a screen 16 stretched therebetween. It will be noted that the side frame members 15 may be in the form of aluminum extrusions having inwardly facing grooves 15a and outwardly extending grooves 15b. A fastening strip 17 may be forced into the groove 15b for confining the screen wire 16 therein. The frame members 16 may be fastened to abutting members by any suitable means such as the bolt 18 and nut 18a. It will be noted that end posts 19 may be suitably secured to the platform member 10 as by angle irons 20 provided with suitable fastening means 20a.

The roof panels D may be provided in the form of one large panel or it may be provided in the form of a number of smaller panels 21. These panels are carried above the upper edges of the panels C which are preferably provided with a rearward and downward taper as illustrated in FIGURE 1 to provide a pitch for the roof. Suitable U-shaped members 22 may be provided to give additional support to the panels C.

The vertical supports E define an open side on one side of the trailer and are in the form of additional end posts 19 which are also suitably secured to the platform member 10 as by angle irons 20. Additional angle irons 20 are provided at the upper portion thereof for securing the supports E to the roof. Doors 23 of any suitable type may be provided for providing access to the trailer porch. The hitch members F may be utilized with suitable fastening means, such as bolts (not shown) for fastening the porch to the house trailer. This support F thus supplements the support offered by the wheels B.

While a preferred embodiment of the invention has been described using specific terms, such description is for illustrative purposes only, and it is to be understood that changes and variations may be made without departing from the spirit or scope of the following claim.

What is claimed is:

A collapsible porch trailer for use with a house trailer including, an elongated substantially rectangular trailer platform, a trailer hitch connected to the trailer platform for towing the trailer, wheels carrying said platform positioned in an intermediate portion of the platform, a plurality of screen side panels positionable to form upright walls on three sides of the platform, means for fastening the screen panels to the platform and to adjacent panels, a roof panel positionable upon the top of said side panels, means for fastening the roof panel to the upper portion of the side panels, vertical supports positionable upon the platform to define an open side on one side of the trailer, means for fastening the vertical supports to the platform and to the roof, means carried adjacent said open side for fastening the porch trailer to the house trailer so that the open side is attached to the house trailer to open into the house trailer, and door means gaining access to the porch without passing through the house trailer, said panels, supports and door means being carried when in transit in a collapsed stacked position upon the trailer platform.

References Cited in the file of this patent
FOREIGN PATENTS

| 29,115 | Australia | July 13, 1931 |
| 807,774 | Great Britain | Jan. 21, 1959 |